United States Patent [19]

Hoyt et al.

[11] Patent Number: 5,320,198

[45] Date of Patent: Jun. 14, 1994

[54] AIR BRAKE STROKE LENGTH ADJUSTMENT GAUGE

[76] Inventors: Gordon C. Hoyt, P.O. Box 195, Little Hocking, Ohio 45742; Bryan L. Hoyt, 19003 Crestview Ct., Westfield, Ind. 46074

[21] Appl. No.: 95,508

[22] Filed: Jul. 22, 1993

[51] Int. Cl.$^5$ .............................................. F16D 66/02
[52] U.S. Cl. ................... 188/1.11; 188/79.55; 116/208
[58] Field of Search ............. 188/1.11, 79.55, 79.51, 188/324, 329, 330, 332, 338, 339, 79.57-79.61, 196 BA, 196 R; 192/30 W; 116/208, 285, 288, 283, 284, 290, 281, 282, 286, 287, 300, 303, 304, 307, 310, 309, 311; 73/129, 121, 118.1, 709; 340/454; 92/5 R

[56] References Cited

U.S. PATENT DOCUMENTS

| D. 322,228 | 12/1991 | Hoyt et al. | D10/64 |
|---|---|---|---|
| 2,379,796 | 7/1945 | Freeman et al. | 188/79.55 X |
| 2,522,903 | 9/1950 | Shively | 188/79.55 |
| 3,943,486 | 3/1976 | Hayoshida et al. | 188/1.11 X |
| 4,749,063 | 6/1988 | Garrett et al. | 188/79.51 X |
| 4,757,300 | 7/1988 | Sebalos | 188/1.11 X |
| 4,776,438 | 10/1988 | Schandelmeier | 188/1.11 |
| 4,800,991 | 1/1989 | Miller | 188/1.11 |
| 4,905,800 | 3/1990 | Mathews | 188/1.11 X |
| 4,937,554 | 6/1990 | Herman | 188/1.11 X |
| 4,945,818 | 8/1990 | Ware | 188/1.11 X |
| 4,989,537 | 2/1991 | Hutchinson, Sr. et al. | 188/1.11 X |
| 4,991,310 | 2/1991 | Melia | 188/1.11 X |
| 5,002,164 | 3/1991 | Bowyer | 188/1.11 X |
| 5,044,302 | 9/1991 | Goldfein et al. | 188/1.11 X |
| 5,178,092 | 1/1993 | Schedin | 188/1.11 X |
| 5,244,061 | 9/1993 | Hoyt et al. | 188/1.11 |
| 5,253,735 | 10/1993 | Larson et al. | 188/1.11 |

FOREIGN PATENT DOCUMENTS

| 0208091 | 1/1987 | European Pat. Off. | 188/79.55 |
|---|---|---|---|
| 0148316 | 6/1991 | Japan | 188/1.11 |
| 1582567 | 1/1981 | United Kingdom | 188/1.11 |

*Primary Examiner*—Douglas C. Butler
*Attorney, Agent, or Firm*—Robert A. Spray

[57] ABSTRACT

A gauge for indicating the setting and linear stroke movement of a brake rod of a brake assembly. Reference indicators are provided on both the brake-rod's yoke or clevis and on the arm of the brake's slack adjuster member; and the indicators cooperate, by their relative movement, showing brake rod travel and adjustment as a visual indication by the relative movement by the reference indicator of the linearly-moving clevis with respect to the angular rotation of the reference indicator on the rotating-slack adjuster arm.

20 Claims, 7 Drawing Sheets

AIR BRAKE STROKE LENGTH ADJUSTMENT GAUGE

I. FIELD AND BACKGROUND OF THE INVENTION

The present invention relates to brake apparatus, air actuated, as used in large vehicles including, e.g., trucks, trailers, buses, tractors, and some larger recreational vehicles.

More particularly, the present invention relates to the brake adjustment apparatus which is an integral part of the braking mechanism, as exists between the air chamber cylinder of the brake apparatus and the brake drum and the brake shoe whose forceful engagement achieves the desired stopping effect of the vehicle.

For decades it has been known that air brakes inherently become out of adjustment, because of wear, looseness, and other factors; and the out-of-adjustment condition presents a danger to the driver and the public, as well as of course to the vehicle.

The problem is compounded by the fact that larger vehicles have a plurality of brake mechanisms (because of the plurality of wheels), and when the brake mechanisms of the plurality of brake systems come into conditions of differing adjustment, the situation becomes not merely that of poor vehicle-stopping effect, and brake wear, but also of poor vehicle control due to the braking effect being different at different portions of the overall vehicle.

A further and long known problem of air-brake adjustment is that drivers, mechanics and other maintenance people will over-adjust the air brakes in order to compensate for the movement and keep the brakes in adjustment for a longer period of time. This over-adjustment results in excessive brake wear, which in itself is expensive and eventually dangerous.

In order to adjust the brakes with or without automatic slack adjusters, a person has had to crawl under the vehicle, mark the brake rod, come out from under and apply the brakes from the cab, then get back under and measure the distance the mark has moved, a procedure that discourages proper maintenance.

Automatic slack adjusters were introduced to adjust the brakes automatically when they became out of adjustment. This does partially solve the problem; however, they are not entirely accurate, and become dirty, and being mechanical are subject to wear. They often are improperly installed. Many will over-adjust when brakes get out of adjustment, resulting in premature brake wear.

To confront the out-of-adjustment situation, automatic slack adjusters, along with visual brake stroke indicators to show if brakes are being properly adjusted, are being used and are becoming mandatory; and the present invention and its concepts advantageously provide brakes-adjustment indication both with and without the use of automatic slack adjusters, and will provide a determination of brake rod adjustment within both minimum and maximum limits.

As shown herein, the prior art has attempted, with varying amounts of success, brake adjuster indicator mechanisms; and such prior art has shown a long recognization of problems of brake stroke indicators, such as (a) a desirability of relatively easy visibility of the indicator without having to get under the vehicle; (b) the indication of brake adjustment as being under-adjusted, over-adjusted, or within legal limits; (c) preferably indicate how much travel remains before exceeding the legal limits; (d) allow a visual inspection to determine if all brakes were displaying balanced braking action; and (e) help indicate proper brake balance when brakes are replaced: etc.; and by novel means and novel concepts, the present invention achieves all of those criteria, advantageously, and with a novel cooperation of components,. and also provides other advantages as explained herein.

II. SUMMARY OF THE INVENTION AND ITS CONCEPTS

In carrying out the invention in a preferred form, the brake apparatus is provided with novel gauge means for indicating the linear stroke movement of a brake rod of a brake assembly.

More particularly, the concepts provide that reference indicators are provided on both the brake-rod's yoke or clevis and on the arm of the brake's slack adjuster member. The reference indicators are cooperative, showing brake rod travel; and, together, they provide a stroke-length gauge of novel concept.

Accordingly, in use to check the brakes and their operativity as shown by the length of travel of the brake rod prior to the engagement of the brake apparatus components which limit the maximum brake rod stroke. (which for decades has Been known widely in the prior art as an indication of brake operativity and expected brake life),the brake rod travel is indicated for easy reading and more accurate reading by the present invention, in comparison to the prior art.

That is, the brake rod travel by the present invention is shown by the relative movement by the reference indicator of the linearly-moving clevis with respect to the angular rotation of the reference indicator on the rotating slack adjuster arm, a relationship not provided as the determining factor in any gauge of prior art apparatus or brake-checking procedure.

III. PARTICULAR BRAKE DEVICES AND BRAKE ADJUSTMENT DEVICES OF THE PRIOR ART, AS SHOWING THAT THE PRIOR ART DID NOT SUGGEST THE PRESENT CONCEPTS

The inventors have here listed all prior art which they consider to be the least remote from the present invention and its concepts which achieve the combination of the present invention; and they have given full consideration to all while they were deciding whether the patentability opportunity as to the combination here presented was sufficient to obtain protection for their invention by filing a patent application:

| Name: | Patent No.: | Issue Date: |
|---|---|---|
| Hoyt, et al. | 5,244,061 | 9/14/93 |
| Goldfein | 5,044,302 | 9/3/91 |
| Melia | 4,991,310 | 2/12/91 |
| Ware | 4,945,818 | 8/7/90 |
| Schandelmeier | 4,776,438 | 10/11/88 |
| Sebalos | 4,757,300 | 7/12/88 |
| Tokico Ltd. (Gr. Br.) | 1,582,567 | 1/14/81 |

These references from the prior art are not adequate to show or suggest the particular combination of the present invention, for reasons as follows:

Perhaps the least remote prior art device, in consideration of the invention nature of the present concepts, is the Hoyt device, cited above, as to which the present inventors were joint inventors.

That Hoyt device avoided a testing task of measuring and subtracting, but by an observation depending on the linear difference between a reference marker mounted on the brake rod rather than on the clevis; and instead of a comparison with the rotation of the adjuster arm, it required the addition of an extra long bolt, and sometimes a bracket-mounting, for connection of the bolt to the air chamber, and required extra reference objects mounted in a "go:no go" fashion on-that extra bolt, all quite different (and less advantageous) from the present invention's concepts and construction.

Even in models using the clevis for locating and even touching the clevis by a brake rod travel-measuring component, the reference component is only "on" the brake rod, and is "on" the clevis only in the sense of being jammed between the jam nut and the forward end of the clevis, not "on" the clevis.

Goldrein is somewhat similar to the Hoyt patent's device from the present inventive concepts. I.e., Goldrein has an indicator mounted on the brake rod rather than on the clevis; and it indicates by linear comparison to an extra tube spring-pressed or glued to the air cylinder, or, in a special embodiment (FIG. 5) indicates by a sliding of a rod in a carrier tube, all quite different from the present invention.

Melia, like Goldfein, has an indicator mounted on the brake rod rather than on the clevis; and it indicates by linear comparison to an extra probe rod which is not a part of the installation but is positioned into use by the tester. There is no use of the present invention's use of the yoke to carry a reference as to the angular rotation of the adjuster arm.

Ware shows a brake rod stroke indicator device using the principle of spring differential and air pressure change to apply brake pressure, but no use of the present invention's use of the yoke to carry a reference as to the angular rotation of the adjuster arm.

The Schandelmeier brake adjuster indicator may appear at first glance to be less remote than the others; however, further notice of the Schandelmeier device and its concepts shows not only that it fails to show or suggest the present invention's concepts of a combination of a reference on the yoke and on the adjuster arm, but the earlier date of Schandelmeier in comparison to the later patents discussed above shows that the later patents have shown a trend away from the approach being followed by Schandelmeier.

More particularly, Schandelmeier does show a reference at "A" as a clevis feature of the brake rod 24, but the reference mark at "A" is on the clevis pin, not the clevis as in the present invention. Moreover, showing that Schandelmeier lacks the present invention's concepts, his other reference "50" is not on the adjuster arm, but is on a separate and special bracket assembly 40 which is fixed to the non-moving parts, i.e., the air chamber housing, and that reference "50" is made slidable along a slot 44, on that bracket member 40.

Accordingly, although Schandelmeier has one reference carried by the clevis (although that reference is on the clevis pin rather than the clevis, inherently farther away from a comparative reference than is the clevis reference in the present invention), Schandelmeier does not come close to the present invention's concept of the other reference being on the rotating adjuster arm, achieving a close indication of the linear travelling of the brake rod by the observation of the reference marks on the clevis and on the adjuster arm itself.

Sebalos, as do the others, neither has nor suggests the concepts of using the clevis as a reference carrier, nor of using the angular rotation of the adjuster arm, to determine the linear distance of brake rod travel.

The British patent of Tokico No. 1,582,567 (1981) illustrates that the prior art for more than ten years has used the brake assembly yoke as a mounting for a sensor; but the brake pad has been worn, the sensor warns by electrically contacting the brake disc, a quite different concept and construction, from the present invention's use of the yoke to carry a reference as to the angular rotation of the adjuster arm.

IV. PRIOR ART CAPABILITY AND MOTIVATIONS, AS HELPING TO SHOW PATENTABILITY HERE

Even in hindsight consideration of the present invention to determine its inventive and novel nature, it is not only conceded but emphasized that the prior art had many details usable in this invention but only if the prior art had had the guidance of the present concepts of the present invention, details of both capability and motivation.

That is, it is emphasized that the prior art had/or knew several particulars which individually and accumulatively show the non-obviousness of this combination invention. E.g., a. The prior art has long had truck, trailer, and bus equipment having brakes as a most critical and most significant component;

b. The prior art knew the advantages of economical and accurate checking of brake safety factors as a means of minimizing brake failures and highway accidents;

c. The prior art has long known that brake mechanisms and themselves to measurements as a test or analytic procedure of determining an indication Of dangerous brake wear;

d. The prior art has long known that brake wear is an important and determinable factor of brake operativity and brake life expectancy;

e. The prior art has had the knowledge of devices which are sold as wear indicators, and has long known of their advantages and disadvantages, and that prior art devices do not meet the convenience and other standards of the present invention;

f. The prior art has been increasingly encouraged and mandated by governmental agencies, insurance companies, highway safety groups, various economic interests, etc., to improve highway safety;

g. The long-existing practice of a driver using the braking mechanism of a temporary trailer has long meant that the presumed interest in his own personal safety does not always give the truck driver a high motivation to sufficiently often cheek trailer brakes or have them sufficiently often serviced;

h. The prior art has for decades known that of all the many components of a truck, trailer, and bus, none of their components are as used in an intentional "wearing out" or rapid deteriorative function or operativity as are the vehicle's brakes;

i. The prior art has-for decades known that of all the many components of a truck, trailer, and bus, none of their components are as used in a function by which they need servicing so often, or cause such differences in frequency of servicing needs;

j. The prior art has long known that air brakes work their way out of adjustment in a gradual manner, causing a danger by bother of the brakes becoming out of adjustment, as well as the brakes becoming worn; and even though those factors are related either of them can be the basis for danger;

k. The prior art has long known that brake adjustments are not always made accurately, whether unintentionally, or even intentionally such as to over-adjust the brakes to prolong the interval between brake adjustments;

l. Automatic slack adjusters have been often less than fully sat is factory, because of some inherent lack of accuracy, incomplete maintenance, wear, impropriety of installation, etc;

m. The prior art and related industries have long known that random and other maintenance checks, police inspections, and other attempts to monitor and/or police brake maintenance, are not sufficiently an incentive to better care and better maintenance, even though it is publicized that often a considerable percentage of large vehicles are operating with improper brakes and improper brake adjustment;

n. The prior art has been quite capable of providing relatively movable travel-measuring indicator units, even one of them being provided on the brake rod, and yet the prior art has not conceived of the particular invention of the combination of indicator units including one on the adjuster arm itself;

o. The prior art has always had sufficient skill to make many types of marking calibrations, pointers, printed and/or cast markings, more than ample to have provided full measurement indicators as used in achieving the measurement indicators of the present invention;

p. Substantially all of the operational characteristics and advantages of details of the present invention, when considered separately from one another and when considered separately from the present invention's apparatus and accomplishment for the apparatus, are within the skill of persons of various arts., but only when considered away from the integrated and novel combination of concepts which by their cooperative combination achieves this advantageous invention.

q. The details of the present invention, when considered solely from the standpoint of construction, are exceedingly simple; and the matter of simplicity of construction has long been recognized as indicative of inventive creativity.

r. Similarly, and a long-recognized indication of inventiveness of a novel combination, is the realistic principle that a person of ordinary skill in the art, as illustrated with respect to the claimed combination as differing in the stated respects from the prior art both as to construction and concept, is that the person of ordinary skill in the art is presumed to be one who thinks along the line of conventional wisdom in the art and is not one who undertakes to innovate.

s. Ever since the prior art has had any awareness of principles of geometry, surely at least since the world has had vehicles equipped with air brakes and brake-adjuster arms, much of the prior art has surely known enough geometry to realize that if an arm member is pivotally connected at a first end to a fixed center, and pivotally connected at a pivotal connection at its second end to a moving member whose path is generally transverse to the axis of the arm as drawn between the two pivotal connection points, that as that moving member moves along such a path, it will (a) cause the arm to rotate about its first end, and (b) a fixed reference place on the moving member, offset from the axis of the second pivotal connection and located between the two pivotal connections, will move relatively laterally to the axis line drawn between the arm's two pivotal connections, and (c) the amount of said relative movement of the reference place with respect to the arm axis will be a function of the amount of rotation of the arm, and thus by that amount of arm rotation be a function of the length of movement of the said moving member.

t. Similarly, in retrospect it seems that most all brake adjustments, and most all brake inspections, would have been seen by the servicer to inherently and always include a relative movement of the brake rod and adjuster arm, and even further that there was such a relative movement even though they were of different types, i.e., linear movement of the brake clevis, and angular rotation of the adjuster arm; yet, in spite of this fully-seeable operativity, none prior to the present invention had the creativity to provide a novel gauge means dependent specifically upon those always-visible factors.

Accordingly, although the prior art has had capability and motivation, amply sufficient to presumably give incentive to the development of adjustment measurement equipment according to the present invention, the fact remains the present invention has awaited the present creativity and inventive discovery of the present inventors. In spite of ample motivation and capability shown by the many illustrations herein, the prior art did not suggest this invention nor its concepts.

V. SUMMARY OF THE PRIOR ART'S LACK OF SUGGESTIONS OF THE CONCEPTS OF THE INVENTION'S COMBINATION

In spite of all such factors of the prior art, the problem here solved awaited these inventors' present creativity. More particularly, as to the novelty here of the invention as considered as a whole, the resume of the prior art helps show its contrast to the present concepts, and emphasizes the advantages and the inventive significance of the present concepts as are here shown, particularly as to utility, accuracy, non-need of maintenance, and highway safety assurance.

Moreover, prior art devices known to these inventors which could possibly be adapted for this duty, fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backword look into the prior art, especially since the prior art has long had much motivation as to apparatus of the present invention and to its provisions of highway safety.

And the existence of such prior art knowledge and related articles embodying such various features is not only conceded, it is emphasized; for as to the novelty here of the combination, of the invention as considered as a whole, a contrast to the prior art helps also to show both the great variety of the various prior art attempts of improvement, and the advantages and the inventive significance of the present concepts. Thus, as shown herein as a contrast to all the prior art, the inventive significance of the present concepts as a combination is emphasized, and the nature of the concepts and their results can perhaps be easier understood.

Although varieties of prior art are conceded, and ample motivation is shown, and full capability in the prior art is conceded, no prior art shows or suggests details of the overall combination of the present invention, as is the proper accepted way of considering the inventiveness nature of the concepts:

That is, although the prior art may show an approach to the overall invention, it is determinately significant that none of the prior art .shows the novel and advantageous combination, which provides the merits of this invention, even though certain details are shown separately from this accomplishment as a combination And the prior art's lack of an invention of a stroke length indicator achieving the convenience, reliability, simplicity, and other advantages of the present invention, which are goals only approached by the different concepts of the cited Hoyt gauge and other apparatus, such as cited above, is a prior art lack which has been relatively recently recognized as a long-felt need by the Department of Transportation's National Highway Traffic Safety Administration (NHTSA) in its specific statement that "there is a need for brake adjustment indicators, whether brake adjustments are maintained manually or automatically.+ 50 Fed. Reg. 20,396, 20,398 (1991) . And "NHTSA believes that the indicator markings should be readable from at least 8 feet away, using an ordinary flashlight with two D-cell batteries. This would allow a person to check adjustment without crawling under the vehicle." Id. at 20,399.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

VI. BRIEF DESCRIPTION OF THE DRAWINGS

The above description of the novel and advantageous invention is of somewhat introductory and generalized form. More particular details, concepts, and features are set forth in the following and more detailed description of illustrative embodiments, reference being had to the accompanying generally diagrammatic and schematic drawings, illustrating concepts, construction, and operational details, and in which:

FIG. 2 shows the brake as being at an adjustment of minimum stroke length that the brakes should be adjusted;

FIG. 3 shows the brake adjustment to provide for the maximum limiting length for brake travel;

(Because of this obvious disadvantage of lack of brake effect, the law and safety standards have long limited the stroke to this point and not beyond.)

Figure 1:
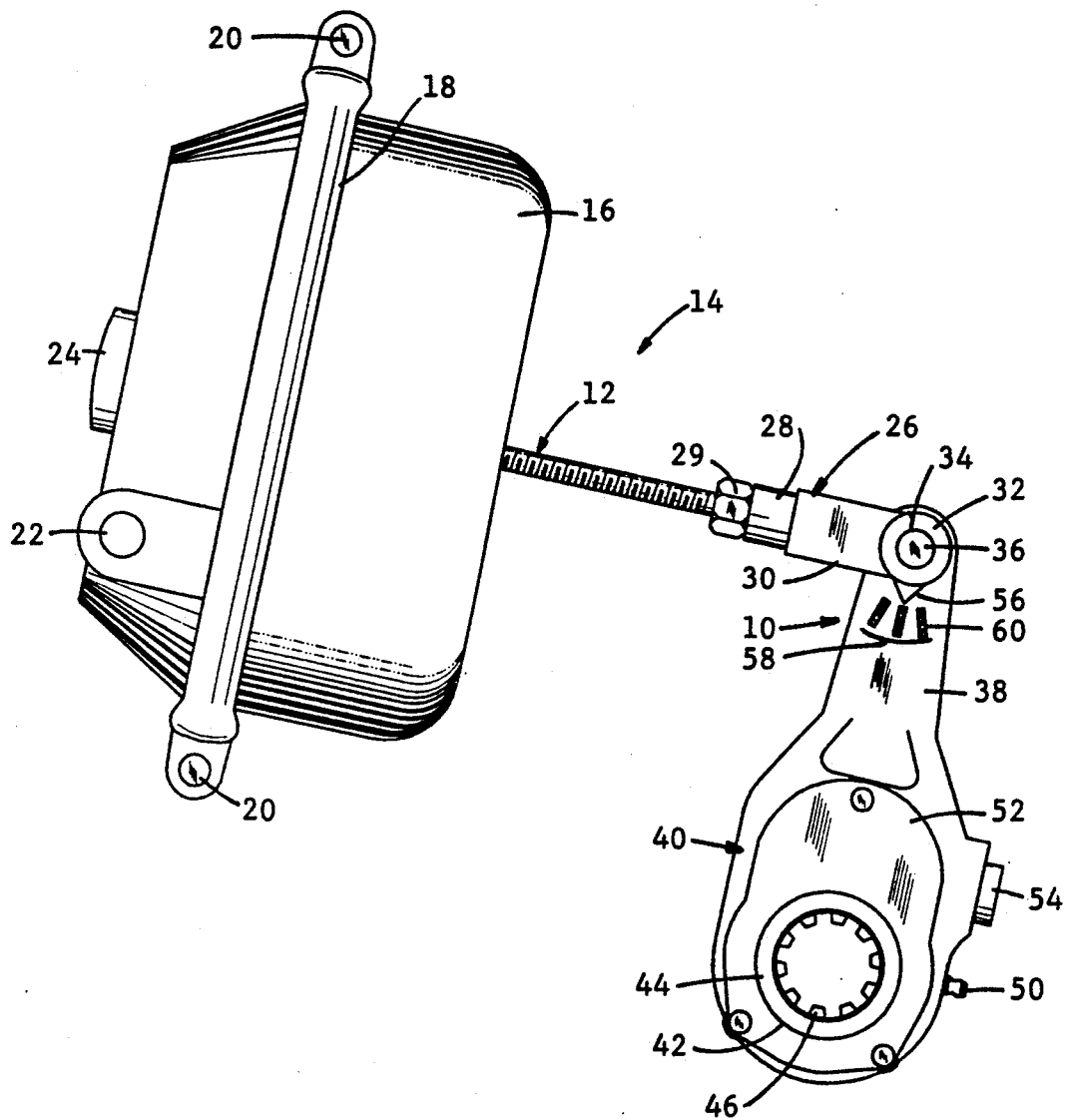
FIG. 1 is a side elevational view of a brake apparatus for a truck or other large vehicle, the assembly being provided with the brake adjustment-indicating means according to the present invention in a first embodiment.
Figure 2:
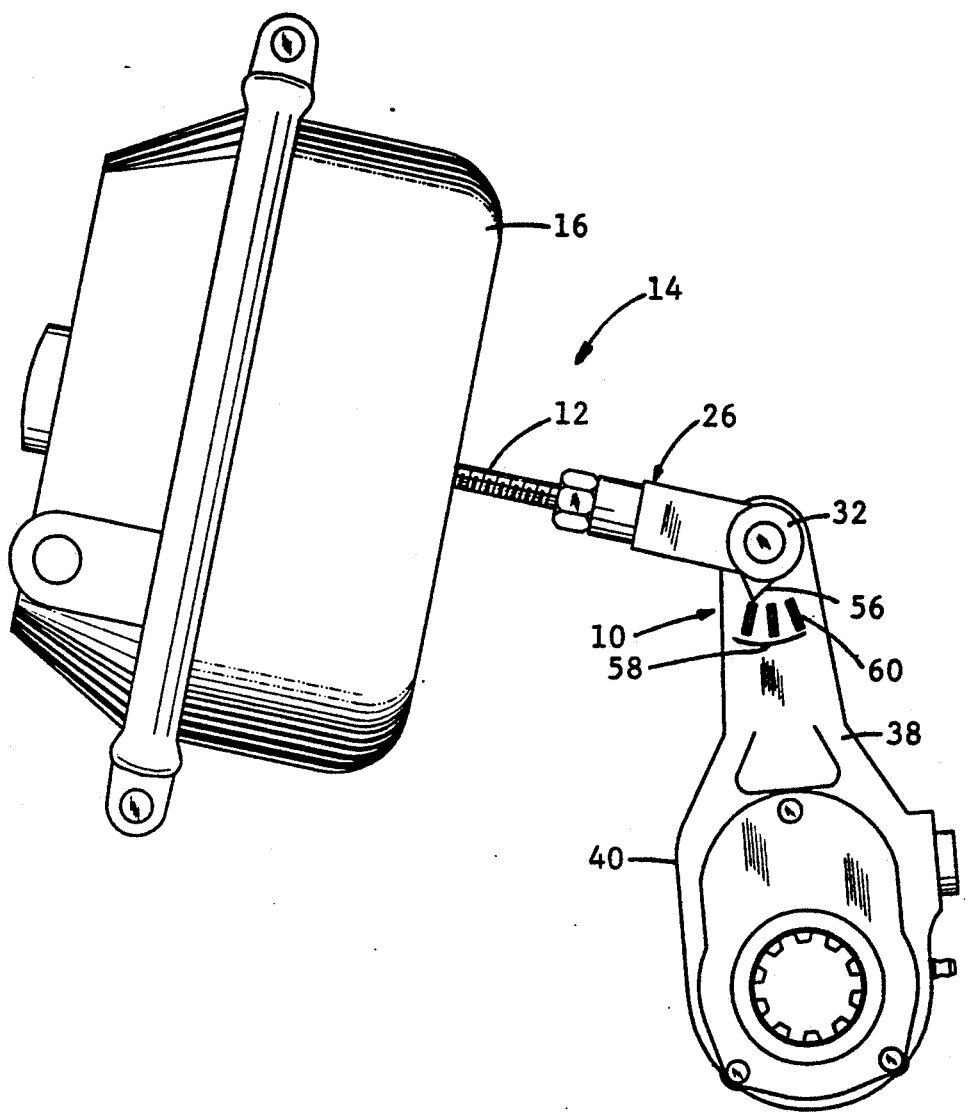
FIGS. 2 and 3 are views of the first embodiment according to FIG. 1, and more particularly.
Figure 3:
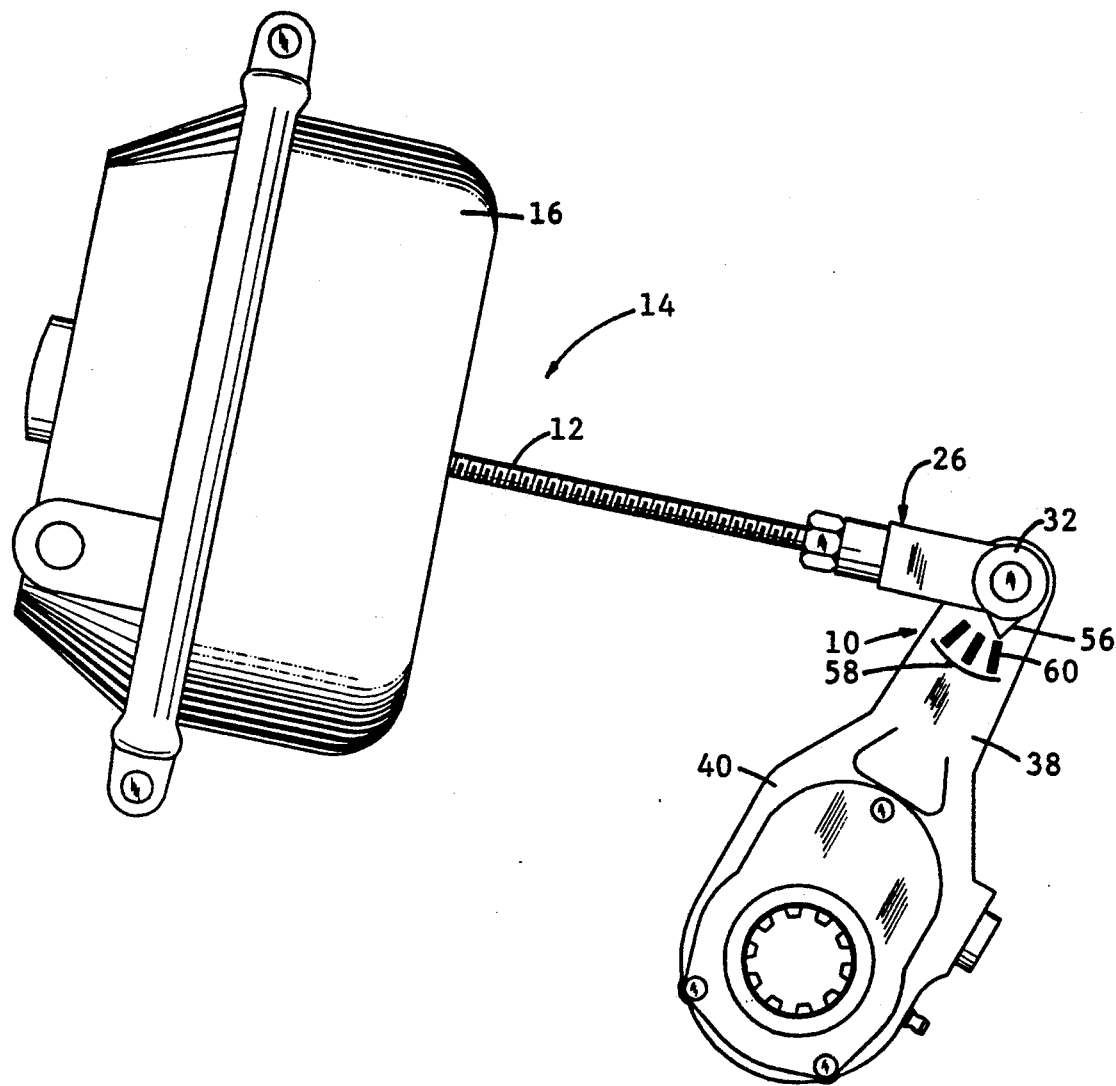
Figure 4:
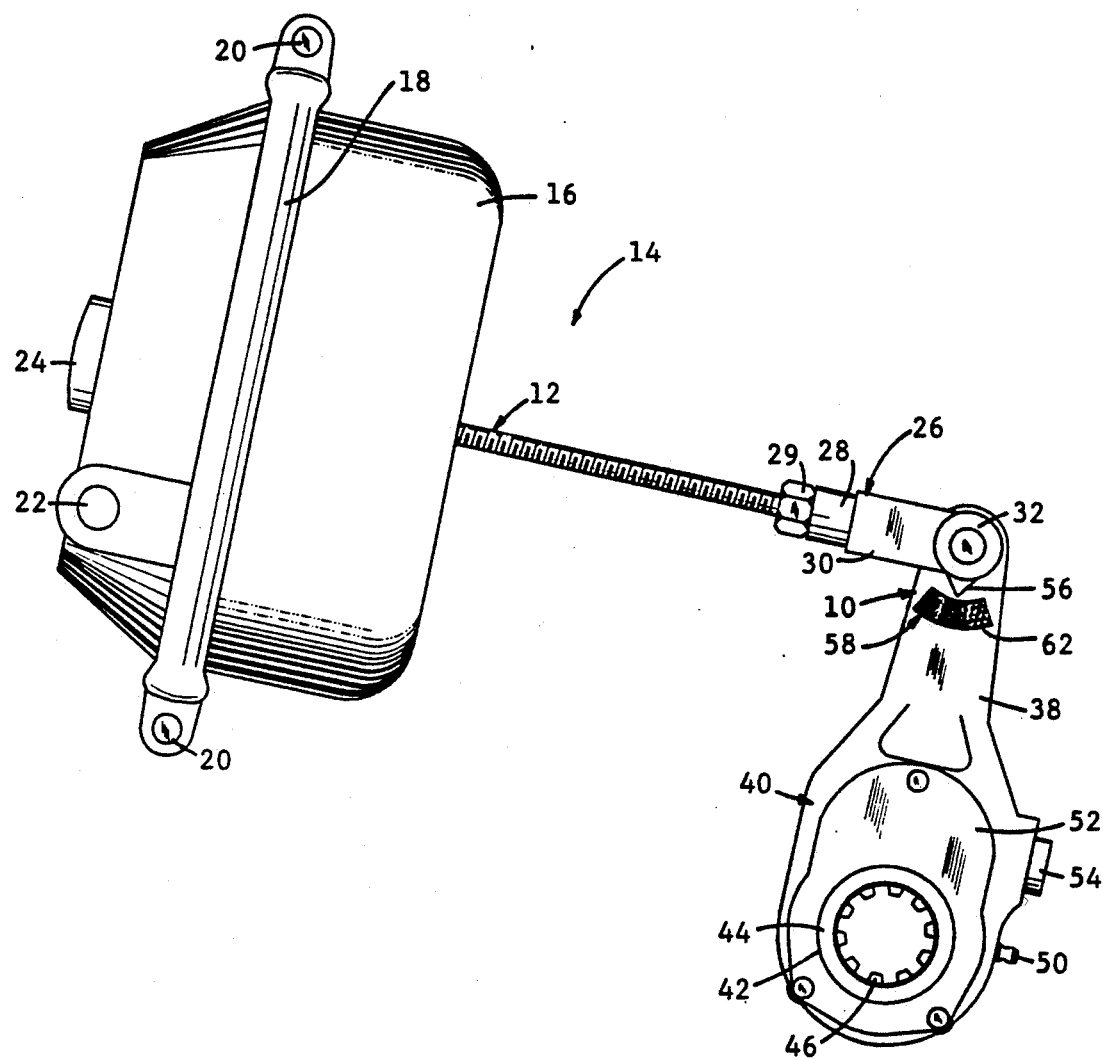
Figure 5:
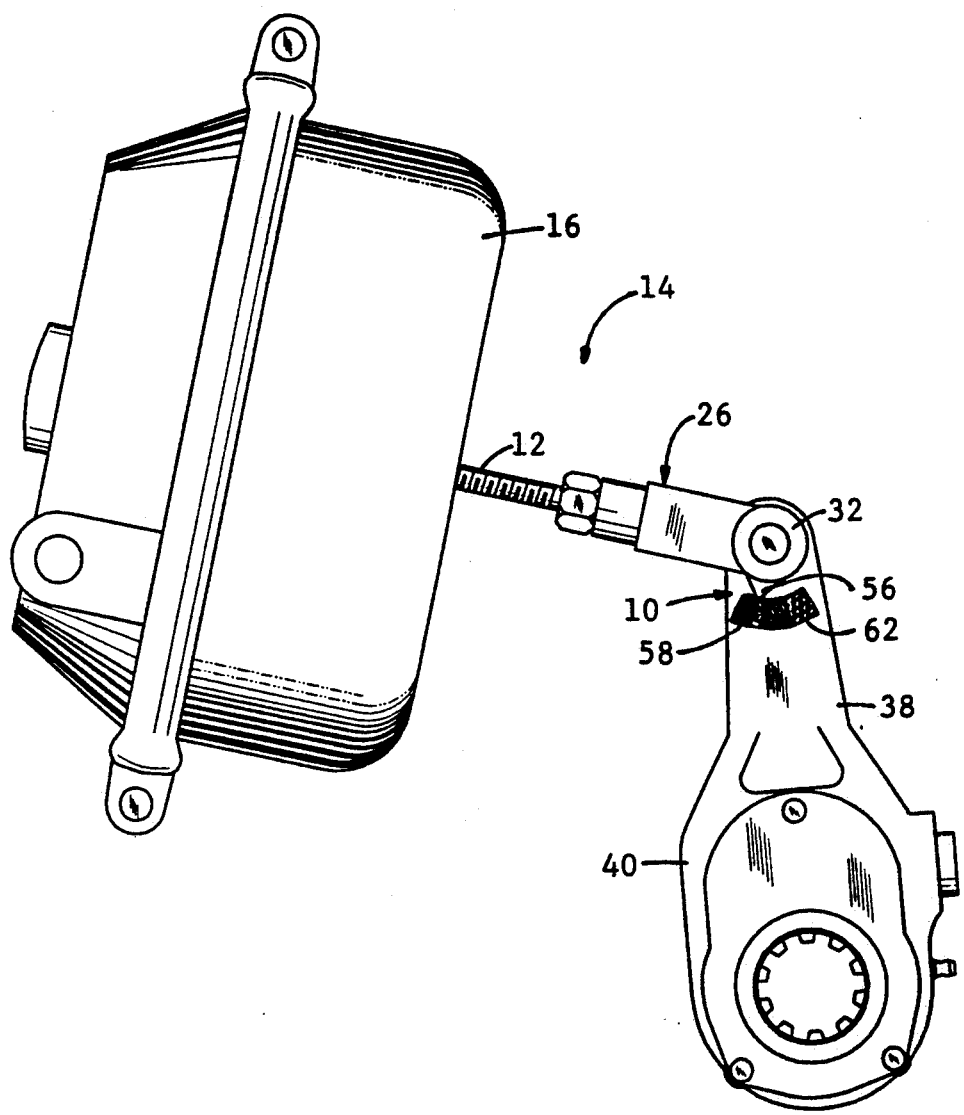
Figure 6:
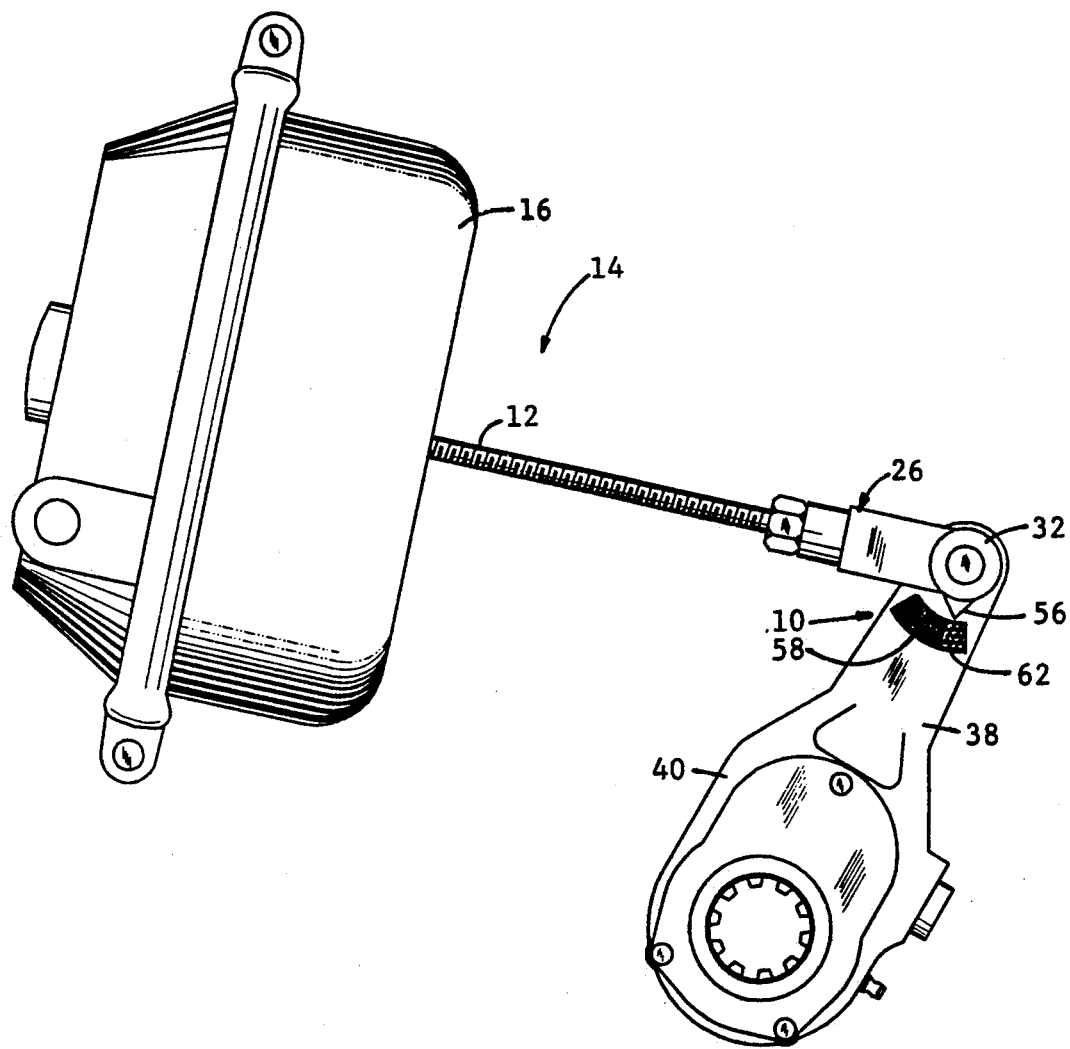
Figure 7:
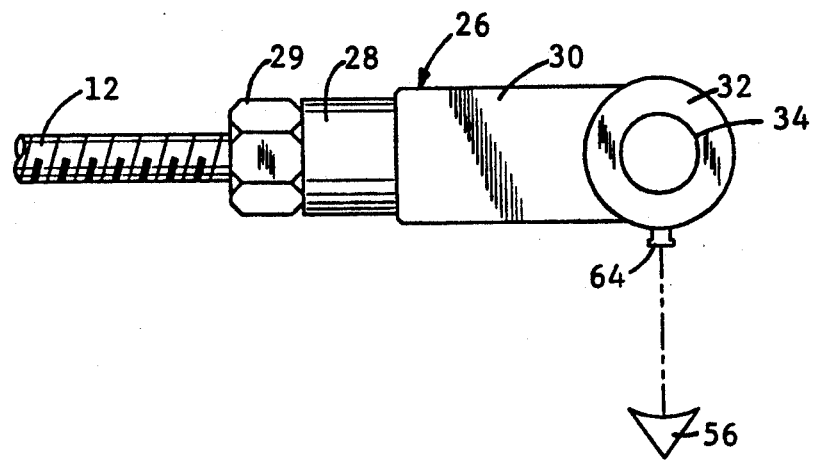
Figure 8:
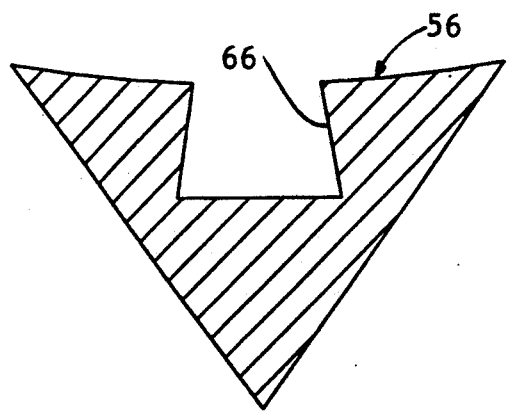

FIGS. 4, 5, and 6 are views of a second embodiment, corresponding, respectively, to the views of the first embodiment's FIGS. 1-3, except that in FIGS. 4-6, the indicator reference indicia on the adjuster arm are according to a second embodiment of the invention;

FIG. 7 is an enlarged detail view of the end of the brake rod, showing the clevis or yoke attached thereto, the view also showing, in exploded view manner, the clevis reference body of both embodiments, which is to be assembled to the clevis reference body retainer; and FIG. 8, in further enlarged scale, illustrates the clevis reference body. Shown in Cross-section to illustrate its internal recess by which it is retained onto the clevis reference body retainer.

VII. DETAILED DESCRIPTION OF THE INVENTION AS SHOWN

As the concepts are illustrated in the drawings, the present invention provides a novel .and advantageous air brake stroke length gauge means 10 by a novel combination of cooperative components, which, in their operative combination, provide an indication of setting and travel of the brake rod 12 of a vehicle's air brake apparatus 14.

(The overall brake apparatus with which this invention is used is quite conventional, and in the drawings is illustrated as such, here shown and described for simplicity as to the present invention's concepts as brake apparatus not having automatic slack adjuster components, but the invention and its concepts and components nevertheless being applicable to automatic slack adjuster brake apparatus. Considering therefore the overall brake apparatus 14 as shown, its own components as shown are now described somewhat schematically, as to both construction and operativity, mainly just to indicate setting for particulars of the present gauge invention 10, and their related operativity and cooperativity with one another and with the components of the overall brake apparatus 14; for the conventional Brake apparatus and its basic components are well known.)

The description of the basic brake apparatus components thus begins (at the left in all of FIGS. 1-6) with the air chamber cylinder 16 from which the brake rod 12 extends, the air chamber cylinder 16 being fixedly mounted on the vehicle (the vehicle itself being not shown except as indicated by the vehicle components such as the chamber 16's supportive clamp band 18 and its bolts 20, the air inlet nipple 22, and the brake release nut 24, all as typical or conventional parts of a brake apparatus).

The brake rod 12, in its transmission of braking force to the brake shoe means (not shown) of the vehicle, moves substantially linearly outwardly of the air chamber cylinder 16 when the brake apparatus 14 is activated to impart pressure to the air chamber cylinder 16 and thus move the brake rod 12 (rightwardly as shown) against the bias of brake springs (not shown) .

The brake rod 12 of the brake apparatus 14 as shown also includes a clevis or yoke member 26, that being a forked member having a body part 28 which is screw-threadedly carried on the brake rod 12; and the clevis 26 is securely held to the brake rod 12 by a jam nut 29.

The clevis 26's body 28 carries arms 30 (one shown) which carry transversely-spaced heads 32 having aligned clevis openings 34 (one shown) in the double-armed clevis heads 32 of the clevis body 28.

The clevis' heads 32 carry, by their openings 34, a horizontal and transversely-extending cylindrical clevis pin 36, the clevis pin 36 extending through a hole (not shown) which is in the upper end of the arm 38 of an adjuster member body 40, the arm 38 extending integrally from the body portion 40 as a prior art detail illustrated in the Drawings, thus the arm 38 and the body 40 rotating as an integral unit in accordance with the linear movement of the clevis pin to which the outer end of the arm 38 is rotatably pinned.

The adjuster member body 40, also called a "slack adjuster", is in the linkage between the brake rod 12 and the vehicle's brake shoe means, and is used in adjusting the vehicle's brakes.

The adjuster member body 40 has a horizontal and transverse opening 42 which carries a bushing 44 shown as having teeth 46 past which pass the the splines of a rod or shaft to transmit the brake force torque from the brake rod 12 and adjuster member 40 to the brake shoe mechanism That brake actuation, acting through the clevis 26 and the clevis pin 36, rotates the adjuster arm 38 and adjuster body 40 about the axis of bushing 44 and the rod or shaft just mentioned, that being a fixed axis of the apparatus.

The slack adjuster 40, except as noted below, may be, and here is, of conventional or typical form, and its typical other components are shown as a zerk grease fitting 50, a cover plate 52, and a locking collar 54.

Now as to the construction and concepts of the present invention, which provides the novel gauge means 10 which shows brake adjustment setting and brake rod 12 travel, as shown as determinable by the illustrative embodiments.

There is a first reference indicator 56 provided, carried on the brake rod clevis 26, here as shown on the clevis head 32, and a second reference indicator 58 carried on the arm 38 of the adjuster member body 40.

More particularly, it is to be noted that the first and second reference indicators 56/58 are cooperative to show by their relative movement the linear Stroke length of the brake rod 12, by showing relatively the linear travel of the clevis member 26 and the angular rotation of the adjuster member body's arm 38.

Still more particularly as shown, the first reference indicator 56 is carried on the clevis member 26, and more particularly on the clevis head 32, at a location such that a visible reference portion thereof is adjacent the second reference indicator 58; and, as to particular location of the second reference indicator 58, is shown as located on the adjuster member body's arm 38 between its connection to the clevis pin 36 and the portion of the adjuster member body 40 which, from the adjuster member's arm 38, carries the force of the brake rod 12 to the vehicle's brake shoe mechanism.

Of particular significance to the nature of the second reference indicator 58, as shown in both embodiments, its portions comprise a plurality of indicia 60 in the first embodiment (FIGS. 1-3) which are located relatively laterally of the adjuster member and, as shown, of the adjuster member body's arm 38; and this provides that the relative location of the first reference indicator 56 with-respect to indicia 60 of the second reference indicator 58 shows, when no activation is being applied to the brake apparatus 14, the adjustment condition of the vehicle's brakes, and shows, when activation is being applied to the brake apparatus, the stroke length of the brake rod 12 travel.

(The words "indicia" and its synonym "indicant," as meaning an indicator thing or a mark for a distinct purpose, are found in some but not all dictionaries but with this express note it seems convenient and appropriate to use such a term with a meaning of an thing with an indicator function, although deliberately chosen as a word to be in contrast to the more broad or general word "indicator" which is used herein for the full reference indicating function of the second indicator 58 of both embodiments.)

In the first embodiment (FIGS. 1-3) in which the individual indicia 60 are spaced or discrete, the plurality of indicia 60 are provided to show minimum and maximum settings, which satisfy the manufacturers' and/or the legal requirements, such as DOT and NHTSA. Moreover as shown, one of the plurality of indicias 60 is in the center position, indicating how far the brake rod 12 would need to move to be either over or under adjustment, and indicating how much adjustment movement is left before exceeding those requirements.

The indicia 60 of the second reference indicator 58 are desirably provided by integral formations of the adjuster member body's arm 38, shown as by providing them as upraised rib-like bulges or protrusions, or by providing a recess in the surface of the arm 38 and filling the recess with a substance providing high visibility, and having a high dirt and grease resistance, all providing ease and convenience in setting and inspecting the setting and brake rod 12 travel.

The second embodiment (FIGS. 4-6) is essentially the same as the first embodiment; and thus it will not be specifically described except to point out that in the second embodiment (FIGS. 4-6) the second reference indicator 58 is formed by indicia 62 which are shown as surface coatings, and are not discretely spaced. Those individual indicia 62, like the portions or indicia 60 of the first embodiment, are shown as being at least three in number and provide in the overall an indicator region shaped as an arcuate band, shown as a fraction of a circle whose center is the hole (not shown) in the adjuster arm 38 which, as a pivotal connection there, rotatably receives the clevis pin 36, and is thus concentric with the clevis pin 36 and the clevis hole 34.

Desirably, as is shown in FIGS. 4-6, the individual indicia 62 are surfaced with different colors.

As shown in FIG. 7 and 8, the first reference indicator 56 is shown as a pointed body member pointing down toward the region of the second reference indicator 58 when the body member 56 is affixed to the clevis 26, more particularly to the clevis head 32. That fixing of the pointed reference body 56 to the clevis head 32 is shown by provision of a retainer lug 64 provided on the bottom of the clevis head 32; and with a forged clevis 26 as shown, the retainer lug 64 may be provided as an integral extension or protrusion of the clevis head 32.

The fixing of the pointed reference body 56 to the retainer lug 64 is schematically shown in FIG. 8 by the body 56 having an upwardly opening recess 66, with upwardly converging walls by which the body 56 may be forced onto the retainer lug 64 for a firm retention thereto.

The use of the gauge 10, it being always present by the reference indicators 56/58 which automatically provide and show brake rod setting and travel, is very easy and reliable. That is, simply set the maxi brakes and visually see how the pointer 56 moves in relationship to the marks of 58 (60 or 62 as shown) on the adjuster body arm 38. As it passes the indicia 60 of the indicator 58 on the arm 38, the pointer 56 will show conditions of brake stroke as to being over, under, or correctly adjusted. If pointer 56 indicates beyond the outer mark 60 (FIG. 3) it shows the brake being out of adjustment in the non-acceptable area (per specification of federal law). If it is approaching one mark or the other, the servicer or inspector will know how much more movement remains before being either over or under adjusted.

In FIG. 1, it will be noted that the parts are shown in a position in which the brake adjustment shows to be at an optimum leverage position for the brake, allowing and providing for the maximum mechanical leverage to be applied to the brakes, which also corresponds, as shown, to a 90° angle between the brake rod and the arm of the slack adjuster, which mechanically is the strongest leverage for the pivotal connection between the brake rod and the adjuster arm.

FIG. 2 shows the brake as being at an adjustment of minimum stroke length that the brakes should be adjusted; i.e., with any stroke length less the brakes would be considered as being adjusted too tight, giving the disadvantage of continuous rubbing between the brake show and the drum.

FIG. 3 shows the brake adjustment to provide for the maximum limiting length for brake travel, i.e., a stroke length beyond which any available energy would not be applied to the brake shoes, thus no vehicle-stopping brake operatively at all.

These reminders as to principles known to the prior art indicate just a brief summary as to the uses of the present invention.

VIII. SUMMARY OF COMPONENTS AND OPERATIONAL DETAILS, AND THEIR ADVANTAGES

The present invention as detailed herein has advantages in both concept and in component parts and features; for in contrast to other equipment known to the inventors and to the prior art cited herein, the invention provides advantageous features which should be considered, both as to their individual benefit, and to whatever may be considered to be also their synergistic benefit toward the invention as a whole:

(a) The relatively movable indicator units are inherently accurately located;

(b) The invention lends itself to use with installations with or without automatic slack adjusters;

(c) No measuring, and no subtraction, need be done to get close determination of stroke length and brake adjustment;

(d) Access is as easy or easier than with other apparatus for determination of stroke length;

(e) No additional parts need be installed to what is supplied as original equipment, i.e., a brake rod, a yoke or clevis, and an adjuster arm, for the determination of stroke length and brake adjustment;

(f) Advantage is taken of the several geometric factors of the brake equipment itself, and the kinematic relation of its components, i.e., the pinned connection of the brake rod's yoke or clevis to the adjuster arm, the rotation of the adjuster arm about a fixed center spaced from the arm's connection to the yoke or clevis, and the rotation of the adjuster arm being a function of the length of brake rod stroke, thus achieving a determination of the stroke length by merely an observation of the amount of rotation of the adjuster arm as that arm-rotation is indicated by lineal movement of the yoke or clevis's reference detail's movement with respect to rotation of the adjuster arm, a cooperating combination not shown by the prior art which determines brake rod travel length by various other methods and other principles. Advantages here include (g) Almost zero parts and installation costs;

(h) Non-likelihood of parts becoming loose or inaccurate;

(i) Easy to maintain;

(j) The reference indicia may be in a plurality, to show minimum and maximum settings that satisfy the manufacturer's and/or legal requirements;

(k) An indicia marking desirably is in the center position as well as the extreme movement markings, to indicate how far the brake rod would need to move to be either over or under adjustment; and this feature not only indicates if the brakes were over or under DOT or NHTSA and manufacturer's stroke ranges for air chambers/rod mechanisms, but also indicate how much movement is left before exceeding these requirements;

(l) Indicator marks on the main body may be made extremely visible by casting below the main body surface and filling in with a bright, light-reflective polymer or some other dirt and grease resistance material;

(m) The pointer on the yoke may also be brightly colored with a light-reflective, grease and dirt resistant material, which would allow a simple visual check of brake adjustment at night by use of a common flashlight without crawling under the vehicle;

(n) The overall advantages encourage the proper and frequent adjustment of the brakes of all the brake units. of the vehicle, thus avoiding irregularity of braking effect and thus avoiding the difficulty of vehicle control.

IX. CONCLUSION

It is thus seen that an overall brake apparatus, constructed and used according to the inventive concepts wherein set forth, provides novel concepts of a desirable and usefully advantageous device, yielding advantages which are and provide special and particular advantages when used as herein set forth, as to adjustability and brake rod travel indication, without measuring brake rod travel, and without subtraction to calculate the length of brake rod movement.

In summary as to the nature of the overall device's advantageous concepts, their novelty and inventive nature is shown by novel features of concept and construction shown here in advantageous combination and by the novel concepts hereof not only being different from all the prior art known, even though brake rod travel-length as a brake-condition indicator has been known for scores of years, but because the achievement is not what is or has been suggested to those of ordinary skill in the art, especially realistically considering this as a novel combination comprising components which individually are similar in nature to what is well known to most all persons, surely including most of the many makers and servicers of brake equipment components and installations, for an untold number of years, throughout the entire world. No prior art component or element has even suggested the modifications of any other prior art to achieve the particulars of the novel concepts or the overall combination here achieved, with the special advantages which the overall device provides; and this lack of suggestion by any prior art has been in spite of the long world wide use of various types of brake equipment and brake-adjustment equipment.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all the materials, to all persons the entire world over.

Quite certainly this particular combination of prior art details as here presented in this overall combination has not been suggested by the prior art, this achievement in its particular details and utility being a substantial and advantageous departure from prior art, even though the prior has had similar components in a separate state for a multiplicity of uses for numbers of years. And particularly is the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art brake and brake adjuster concepts and devices not achieving particular advantages here achieved by this combination.

Accordingly, it will thus be seen from the foregoing description of the invention according to these illustrative embodiments, considered with the accompanying drawings, that the present invention provides new and useful concepts of a novel and advantageous apparatus, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiments, or form or arrangement of parts herein described or shown.

We claim:

1. A visually indicative stroke length gauge means for visually indicating travel of a brake rod of air brake apparatus of a vehicle, the vehicle having air brake apparatus including a brake rod and an air chamber cylinder from which cylinder the brake rod extends;

the apparatus being such that the brake rod moves substantially linearly outwardly of the air chamber cylinder in response to activation of the brake apparatus;

the air brake apparatus also including a clevis member having a clevis pin, and a rotatable adjuster member having a rotatable adjuster member body having a rotatable arm and a connection of the adjuster member body and the arm;

the clevis member being fixedly carried on the brake rod, and linearly movable therewith; and there being a pivotal connection, by the clevis pin, of the clevis member to the arm of the adjuster member body, the adjuster member body arm and the clevis member being connected solely by that connection, and the clevis member and the adjuster member being relatively rotatably movable due to their pivotal connection by the clevis pin;

the clevis member having a first portion relatively adjacent the air chamber cylinder and a second portion relatively remote from the air chamber cylinder, the clevis pin being connected to the clevis member's second portion;

the gauge means comprising visually indicative reference indicators comprising a first visual reference indicator which is carried by the clevis member's second portion; and a second visual reference indicator which is carried by the adjuster member inwardly of the side edges thereof;

the first and second reference indicators being cooperative to visually show, by their relative movement, the linear stroke length of the brake rod, by visually showing relatively the linear travel of the clevis member and the angular rotation of the adjuster member.

2. The stroke length gauge means invention as set forth in claim 1, in a combination in which the said first visual reference indicator is carried by the clevis member at a location such that a visible reference portion of said first visual reference indicator is adjacent the second visual reference indicator.

3. The stroke length gauge means invention as set forth in claim 2, the adjuster member body's arm having a first portion relatively operatively adjacent the air chamber cylinder, that first portion being the arm portion having the connection to the clevis pin, and a second portion relatively operatively remote from the air chamber cylinder, that second portion being the portion of the arm having the connection to the adjuster member body, in a combination in which the said second visual reference indicator is located on the adjuster member body's arm between its first portion's connection to the clevis pin and the second portion of the adjuster member body's arm, and between the side edges of the said arm.

4. The stroke length gauge means invention as set forth in claim 3, the air brake apparatus being such that the brake rod has a relatively extended position with reference to the air chamber cylinder when activation is being applied to the air brake apparatus, but the brake rod has a relatively retracted position when no activation is being applied to the air brake apparatus;

in a combination in which the second visual reference indicator comprises reference indicia located relatively laterally of the adjuster member body, providing that the relative location of the said first reference indicator with respect to indicia of the said second reference indicator visually shows, when no activation is being applied to the air brake apparatus, the adjustment condition of the vehicle's brakes, and visually shows, when activation is being applied to the air brake apparatus, the stroke length of the brake rod travel.

5. The stroke length gauge means invention as set forth in claim 4, in a combination in which a plurality of reference indicia are provided to visually show what is considered to be minimum and maximum desired settings of the air brake apparatus.

6. The stroke length gauge means invention as set forth in claim 4, in a combination in which a visible portion of the reference indicia is located in a central position, visually showing how far the brake rod would need to move to be either over adjustment or under adjustment, and showing how much adjustability is left before exceeding those considered minimum and maximum settings.

7. The stroke length gauge means invention as set forth in claim 2,
  the air brake apparatus being such that the brake rod has a relatively extended position with reference to the air chamber cylinder when activation is being applied to the air brake apparatus, but the brake rod has a relatively retracted position when no activation is being applied to the air brake apparatus;
  in combination in which the second visual reference indicator comprises reference indicia located relatively laterally of the adjuster member body, providing that the relative location of the said first reference indicator with respect to indicia of the said second reference indicator visually shows, when no activation is being applied to the air brake apparatus, the adjustment condition of the vehicle's brakes, and visually shows, when activation is being applied to the air brake apparatus, the stroke length of the brake rod travel.

8. The stroke length gauge means invention as set forth in claim 7, in a combination in which a plurality of reference indicia are provided to visually show what is considered to be minimum and maximum desired settings of the air brake apparatus.

9. The stroke length gauge means invention as set forth in claim 7, in a combination in which a visible portion of the reference indicia is located in a central position, visually showing how far the brake rod would need to move to be either over adjustment or under adjustment, and showing how much adjustability is left before exceeding those considered minimum and maximum settings.

10. The stroke length gauge means invention as set forth in claim 7, the adjuster member body's arm having a first portion relatively operatively adjacent the air chamber cylinder, that first portion being the arm portion having the connection to the clevis pin, and a second portion relatively operatively remote from the air chamber cylinder, that second portion being the portion of the arm having the connection to the adjuster member body,
  in a combination in which the said second visual reference indicator is located on the adjuster member body's arm between its first portion's connection to the clevis pin and the second portion of the adjuster member body's arm, and between the side edges of the said arm.

11. The stroke length gauge means invention as set forth in claim 10,
  the air brake apparatus being such that the brake rod has a relatively extended position with reference to the air chamber cylinder when activation is being applied to the air brake apparatus, but the brake rod has a relatively retracted position when no activation is being applied to the air brake apparatus;
  in a combination in which the second visual reference indicator comprises reference indicia located relatively laterally of the adjuster member body, providing that the relative location of the said first reference indicator with respect to indicia of the said second reference indicator visually shows, when no activation is being applied to the air brake apparatus, the adjustment condition of the vehicle's brakes, and visually shows, when activation is being applied to the air brake apparatus, the stroke length of the brake rod travel.

12. The stroke length gauge means invention as set forth in claim 7, in a combination in which a plurality of reference indicia are provided to visually show what is considered to be minimum and maximum desired settings of the air brake apparatus.

13. The stroke length gauge means invention as set forth in claim 7, in a combination in which a visible portion of the reference indicia is located in a central position, visually showing how far the brake rod would need to move to be either over adjustment or under adjustment, and showing how much adjustability is left before exceeding those considered minimum and maximum settings.

14. The stroke length gauge means invention as set forth in claim 1,
  the air brake apparatus being such that the brake rod has a relatively extended position with reference to the air chamber cylinder when activation is being applied to the air brake apparatus, but the brake rod has a relatively retracted position when no activation is being applied to the air brake apparatus;
  in a combination in which the second visual reference indicator comprises reference indicia located relatively laterally of the adjuster member body, providing that the relative location of the said first reference indicator with respect to indicia of the said second reference indicator visually shows, when no activation is being applied to the air brake apparatus, the adjustment condition of the vehicle's brakes, and visually shows, when activation is being applied to the air brake apparatus, the stroke length of the brake rod travel.

15. The stroke length gauge means invention as set forth in claim 14, in a combination in which a plurality of reference indicia are provided to visually show what is considered to be minimum and maximum desired settings of the air brake apparatus.

16. The stroke length gauge means invention as set forth in claim 14, in a combination in which a visible portion of the reference indicia is located in a central position, visually showing how far the brake rod would need to move to be either over adjustment or under adjustment, and showing how much adjustability is left before exceeding those considered minimum and maximum settings.

17. The stroke length gauge means invention as set forth in claim 1, in a combination in which the second visual reference indicator is provided integrally with the adjuster member body's arm.

18. The stroke length gauge means as set forth in claim 1, in a combination in which the second visual reference indicator is provided by a recess in the outer surface of the arm, the recess being coated with a substance of high visibility nature.

19. The stroke length gauge means invention as set forth in claim 18, in a combination in which the substance coating the recess of the second visual reference indicator is a material having high dirt and grease resistance.

20. A visually indicative gauge means for visually indicating adjustment of adjustable air brake apparatus of a vehicle,
  such apparatus including a brake rod, and the air brake apparatus also including an air chamber cylinder from which cylinder the brake rod extends;
  the air brake apparatus being such that the brake rod has a relatively extended position with reference to the air chamber cylinder when activation is being applied to the air brake apparatus, but the brake rod has a relatively retracted position when no activation is being applied to the air brake apparatus;

the air brake apparatus being such that the brake rod moves substantially linearly outwardly of the air chamber cylinder in response to activation of the brake apparatus;

the air brake apparatus also including a clevis member having a clevis pin, and a rotatable adjuster member having an adjuster member body and an arm, and a connection of the adjuster member body and the said arm;

the clevis member being fixedly carried on the brake rod, and linearly movable therewith; and there being a pivotal connection, by the clevis pin, of the clevis member to the arm of the adjuster member body, the adjuster member arm and the clevis member being connected solely by that connection, and being relatively rotatably movable due to their pivotal connection by the clevis pin;

the clevis member having a first portion relatively adjacent the air chamber cylinder and a second portion relatively remote from the air chamber cylinder, the clevis pin being connected to the clevis member's second portion; and the gauge means comprising visually indicative visual reference indicators comprising:

a first reference indicator which is carried by the second portion of the clevis member, and a second reference indicator which is carried by the adjuster member;

the second reference indicator comprising indicia located relatively laterally of the adjuster member and inwardly of the side edges thereof;

the first and second visual reference indicators being cooperative to visually show, by the relative location of the said first reference indicator with respect to indicia of the said second reference indicator, when no activation is being applied to the brake apparatus, the adjustment condition of the vehicle's brakes.

* * * * *